United States Patent [19]

Liston

[11] E Re. 30,391

[45] Reissued Sep. 2, 1980

[54] CHEMICAL ANALYSIS CUVETTE

[75] Inventor: Max D. Liston, Irvine, Calif.

[73] Assignee: Abbott Laboratories, North Chicago, Ill.

[21] Appl. No.: 660,258

[22] Filed: Feb. 23, 1976

Related U.S. Patent Documents

Reissue of:

[64] Patent No.: 3,811,780
Issued: May 21, 1974
Appl. No.: 357,063
Filed: May 3, 1973

U.S. Applications:

[62] Division of Ser. No. 133,081, Apr. 12, 1971, Pat. No. 3,748,044.

[51] Int. Cl.[3] ..... G01J 3/46; G01N 21/03

[52] U.S. Cl. ..... 356/409; 73/423 A; 356/244; 356/246; 422/64

[58] Field of Search ..... 356/197, 244, 246, 409, 356/440; 250/576; 73/423 A; 23/253 R, 292; 422/64

[56] References Cited

U.S. PATENT DOCUMENTS

| | | | |
|---|---|---|---|
| 952,802 | 3/1910 | Greene | 356/245 |
| 2,258,073 | 10/1971 | Stevens | 356/246 |
| 2,684,452 | 7/1954 | Sorg | 315/5 |
| 2,879,141 | 3/1959 | Skeggs | 23/253 R |
| 3,322,956 | 5/1967 | Shah | 356/244 |
| 3,441,383 | 4/1969 | Moore et al. | 23/253 R |
| 3,449,959 | 6/1969 | Grimshaw | 73/423 A |
| 3,484,206 | 12/1969 | Loebl | 23/253 R |
| 3,498,136 | 3/1970 | Le May | 73/426 |
| 3,514,613 | 5/1970 | Mashburn | 250/565 |
| 3,521,965 | 7/1970 | Podschadly et al. | 356/246 |
| 3,526,711 | 9/1970 | De Boer | 178/7.3 |
| 3,526,771 | 9/1970 | Henkel et al. | 356/135 |
| 3,531,211 | 9/1970 | Staunton | 356/246 |
| 3,540,858 | 11/1970 | Rochte et al. | 23/253 R |
| 3,547,547 | 12/1970 | Anderson | 356/246 |
| 3,551,062 | 12/1970 | Brown | 356/244 |
| 3,554,654 | 1/1971 | Paatzsch et al. | 356/180 |
| 3,555,284 | 1/1971 | Anderson | 356/246 |
| 3,582,218 | 6/1971 | Anderson | 356/246 |
| 3,586,484 | 6/1971 | Anderson | 23/230 R |
| 3,622,279 | 11/1971 | Moran | 356/246 |
| 3,634,868 | 1/1972 | Pelavin et al. | 356/179 |
| 3,656,116 | 4/1972 | Jansen, Jr. | 250/573 |
| 3,680,967 | 8/1972 | Engelhardt | 356/246 |
| 3,684,452 | 8/1972 | Bessman | 23/253 R |
| 3,698,822 | 10/1972 | Polanyi | 356/246 |
| 3,701,601 | 10/1972 | Plumpe, Jr. et al. | 356/96 |
| 3,703,336 | 11/1972 | Rosse et al. | 356/246 |
| 3,707,354 | 12/1972 | Goodman | 23/253R |
| 3,718,439 | 2/1973 | Rosse et al. | 356/246 |
| 3,759,374 | 9/1973 | Helger et al. | 356/246 |
| 3,771,878 | 11/1973 | Molloy et al. | 356/246 |
| 3,804,593 | 4/1974 | Smythe | 356/246 |
| 3,806,259 | 4/1974 | Boostrom et al. | 356/246 |
| 3,819,271 | 6/1974 | Beug et al. | 356/39 |
| 3,829,223 | 8/1974 | Hamel | 356/246 |
| 3,837,745 | 9/1974 | Acker et al. | 356/201 |
| 3,847,486 | 11/1974 | McCabe | 356/205 |
| 3,873,217 | 3/1975 | Anderson et al. | 356/246 |
| 3,883,308 | 5/1975 | Matte | 356/246 |
| 3,901,658 | 8/1975 | Burtis et al. | 356/246 |

FOREIGN PATENT DOCUMENTS

| | | | |
|---|---|---|---|
| 5618 | 11/1967 | Australia . | |
| 31242 | 6/1969 | Australia . | |
| 919 940 | 1/1973 | Canada . | |
| 347711 | 8/1972 | Sweden . | |
| 661425 | 11/1951 | United Kingdom . | |
| 1069443 | 5/1967 | United Kingdom . | |
| 1074810 | 7/1967 | United Kingdom . | |
| 1116782 | 6/1968 | United Kingdom . | |
| 1173332 | 12/1969 | United Kingdom . | |
| 1181510 | 2/1970 | United Kingdom | 356/180 |
| 1198488 | 7/1970 | United Kingdom . | |

OTHER PUBLICATIONS

Zymat 340 Literature, Baush & Lomb, Jul. 68.

*Primary Examiner*—Vincent P. McGraw
*Attorney, Agent, or Firm*—Ronald E. Larson

[57] ABSTRACT

Improved components, such as a cuvette, are disclosed in the specification.

33 Claims, 7 Drawing Figures

Fig. 3
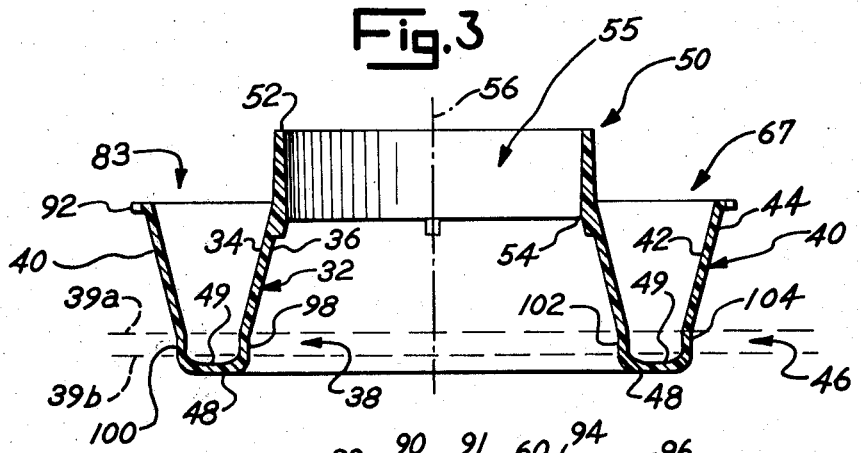
Fig. 2
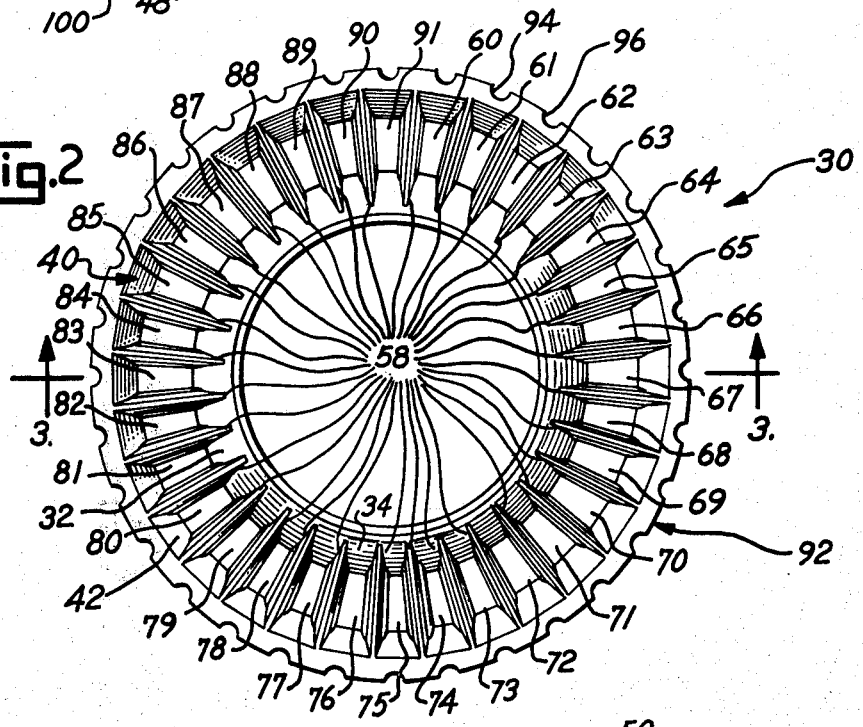
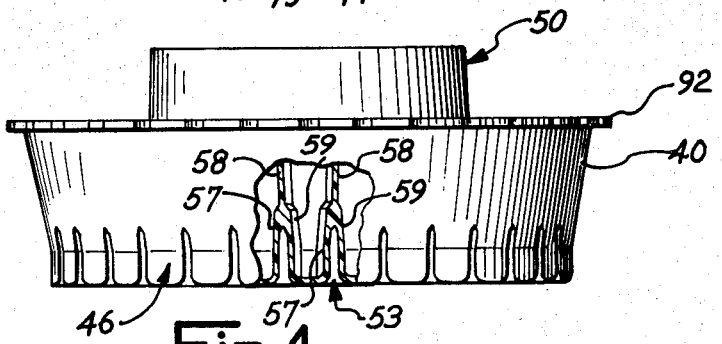
Fig. 4

CHEMICAL ANALYSIS CUVETTE

Matter enclosed in heavy brackets [ ] appears in the original patent but forms no part of this reissue specification; matter printed in italics indicates the additions made by reissue.

RELATED APPLICATION

This application is a Division of my application Ser. No. 133,081 filed Apr. 12, 1971, now U.S. Pat. No. 3,748,044, entitled "Digital Chemical Analysis Apparatus".

BACKGROUND OF THE INVENTION

This invention relates to a chemical analysis cuvette, and more particularly relates to a cuvette which enables the analysis of substances by radiant energy.

In order to rapidly analyze the concentration of a particular substance present in a chemical specimen, such as blood, chemists are placing increasing reliance on various types of machines. Such machines devised in the past may be divided into at least the following types:

1. Blood gas analyzers;
2. Prothrombin time determining systems;
3. Flow systems;
4. Electromechanical methods not related to colorimetry; and
5. Monochromatic servomechanism systems.

Although such machines have somewhat reduced the labor involved in performing chemical analysis, they have exhibited many deficiencies that have limited their overall usefulness. One such deficiency is the difficulty of loading and cleaning the specimen dispensers and cuvettes of prior art systems. Such difficulties are particularly pronounced when flow-through cuvettes are utilized. These cuvettes provide a single chamber for analyzing multiple specimens that must be purged with a relatively large volume of specimen fluid each time a new specimen is introduced into the chamber. Prior art systems also fail to mix the specimen and reagent with the degree of accuracy desired by most chemists.

In order to overcome the difficulties of the prior art devices, applicant's cuvette means preferably comprises integrally-formed sidewalls and spacer means that define compartments in which specimens may be introduced. Opposed, planar window means for transmitting radiant energy may also be provided in the compartments so that the specimens may be analyzed with a degree of accuracy unattained by systems employing curved windows, such as test tubes. By integrally fabricating the sidewall and spacer means from the plastic material described herein, the cuvette means is rendered disposable, thereby eliminating the most common cause of specimen contamination.

DESCRIPTION OF THE DRAWINGS

These and other advantages and features of the present invention will hereinafter appear for purposes of illustration, but not of limitation, in connection with the accompanying drawings, in which like numbers refer to like parts throughout, and in which:

FIG. 2 is a top plan view of a preferred form of cuvette assembly made in accordance with the present invention;

FIG. 3 is a cross-sectional view taken along line 3—3 of FIG. 2;

FIG. 4 is a side elevational view of the cuvette assembly shown in FIG. 2;

DESCRIPTION OF THE PREFERRED EMBODIMENT

Figure 1:
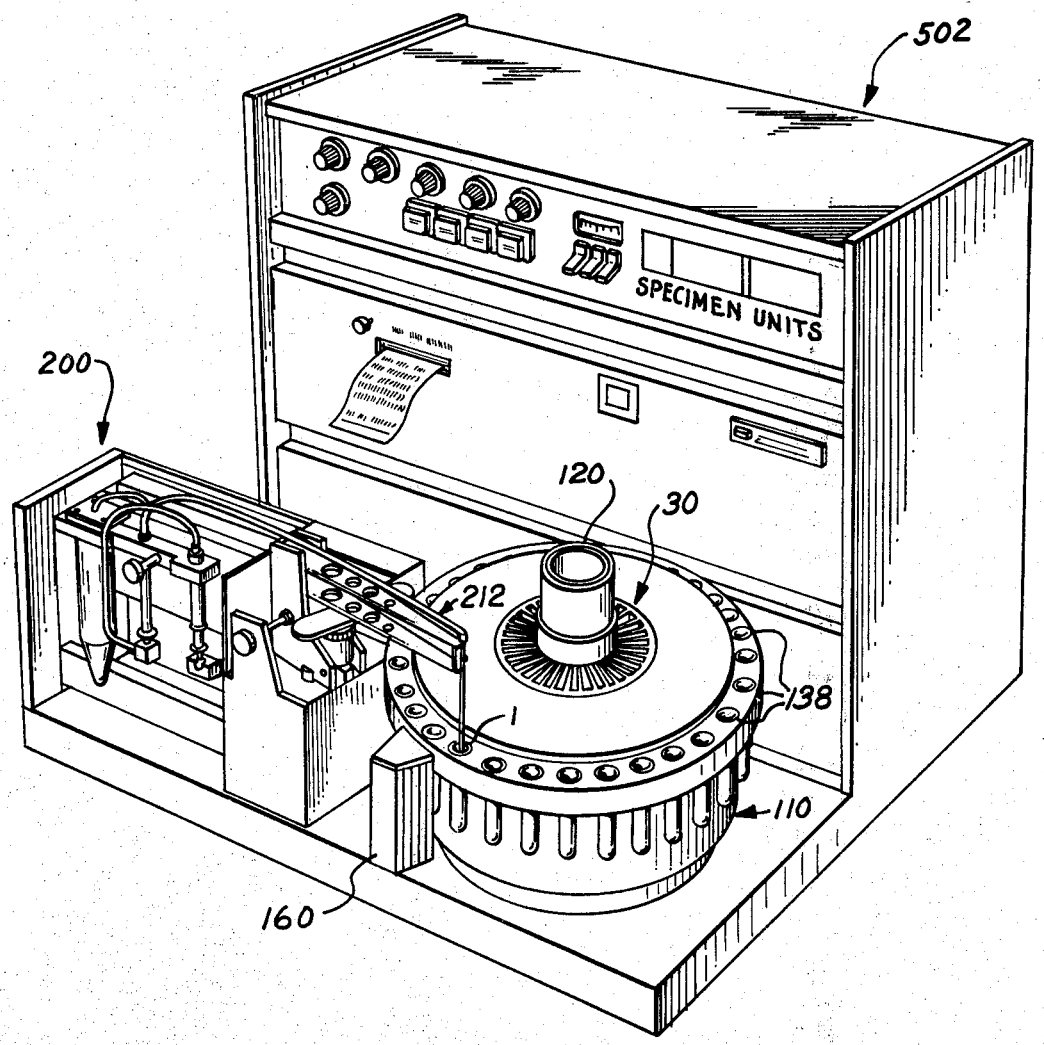
FIG. 1 is a perspective view of a preferred form of apparatus made in accordance with the present invention.

Referring to the drawings, a preferred system for analyzing chemical specimens made in accordance with the present invention basically comprises a cuvette assembly 30; a carrousel assembly 110, including a cycling assembly 168; a dispenser assembly 200; and a console 502 that includes analyzing apparatus, a processing circuit and a memory.

Referring to FIGS. 1–4, cuvette assembly 30 provides 32 compartments in which 32 separate chemical specimens may be mixed and held for analysis. The assembly is integrally formed from an acrylic plastic material that transmits ultraviolet light, such as Rohm and Haas Plexiglas V(811)–100UVT. Applicant has found that this material offers a number of advantages. It is relatively inexpensive, and therefore enables the cuvette to be disposed of after use. In addition, the described acrylic plastic offers excellent optical properties for the transmission of ultraviolet light which are not provided by many other acrylic plastics.

Referring to FIGS. 2–4, cuvette assembly 30 comprises a slanting, inner sidewall 32 having an inner surface 34 and an outer surface 36. Cuvette assembly 30 also comprises a slanting, outer sidewall 40 having an inner surface 42 and an outer surface 44. Sidewalls 32 and 40 are each slanted at an angle of 15° from a vertical plane. Applicant has found that this is the minimum angle required to prevent specimen fluid from splashing out of the cuvette as it is being discharged therein.

Another portion of cuvette assembly 30 comprises a cylindrical collar 50 having an upper edge 52, a lower edge 54, and a central axis 56. Collar 50 defines a ventilating opening 55 that allows the passage of air.

Assembly 30 further comprises a positioning lip 92 attached to outer sidewall 40 in the manner shown. Lip 92 has notches, such as notches 94, 96 that are equally spaced between each other and are located along a center line radius of a compartment.

Spacers 58 are integrally formed with the sidewalls in a fluid-tight manner to form 32 separate compartments 60–91. The compartments lie along a line defining a circle. The lower portion of each spacer is split into two sections 57,59 that separate each of the compartments by an air space 53. This feature enables several cuvettes to nest on top of each other, thereby reducing the space required for storage. In addition, this air space allows the fluid of an incubating device to separately flow around each compartment, thereby reducing the time required to bring the specimens up to temperature. This feature will be described in more detail later. Each of the compartments is adapted to hold a specimen to be analyzed. The lower portion of each compartment is fitted with a bottomwall that is integrally formed with the adjacent spacers and sidewalls in a fluid-tight manner. Exemplary bottomwalls 48 have curved upper surfaces 49 that cause fluid ejected into the compartments to engage in a swirling motion that aids mixing.

Each of the compartments 60–91 is identical and may be understood from exemplary compartments 67 and 83 shown in FIG. 3. Compartment [67] *83* comprises the sidewalls and bottomwalls described previously. In addition, compartment [67] *83* comprises flat, planar portions 98 and 100 that form a window section 38. Likewise, compartment [83] *67* comprises the sidewall and bottomwall described previously. In addition, it comprises flat, planar portions 102 and 104 that form a window section 46. It should be noted that portions 98, 100 are opposed planar members that are parallel to each other. Likewise, portions 102, 104 are also opposed planar members that are parallel to each other and to portions 98, 100. As can be seen in FIGS. 2–4, the flat planar portions forming the window sections lie in a common plane and are integrally formed with the bottomwall and sidewalls. It should be noted that sidewalls 32 and 40 are each 0.040 inches thick, and that the distance between planar portions 98, 100 and the distance between planar portions 102, 104 is in each case exactly 1 centimeter.

As will be described in more detail later, this arrangement of window sections provides an accurate pathlength for a radiant energy analyzing beam not found in the test tube cuvettes employed in some systems. Moreover, since the entire cuvette assembly is made from a relatively inexpensive plastic, it may be disposed of after a single use so as to prevent contamination from previous or improper washing. The disposability of the cuvette is very important, since it eliminates the necessity of using large volumes of reagent to wash the previous sample from a flow-through cuvette. By using the cuvette assembly described herein, the same compartment is used as a reaction chamber and radiant energy analyzing chamber, thereby achieving economy of operation and a more compact system than would be otherwise possible.

Figure 5:
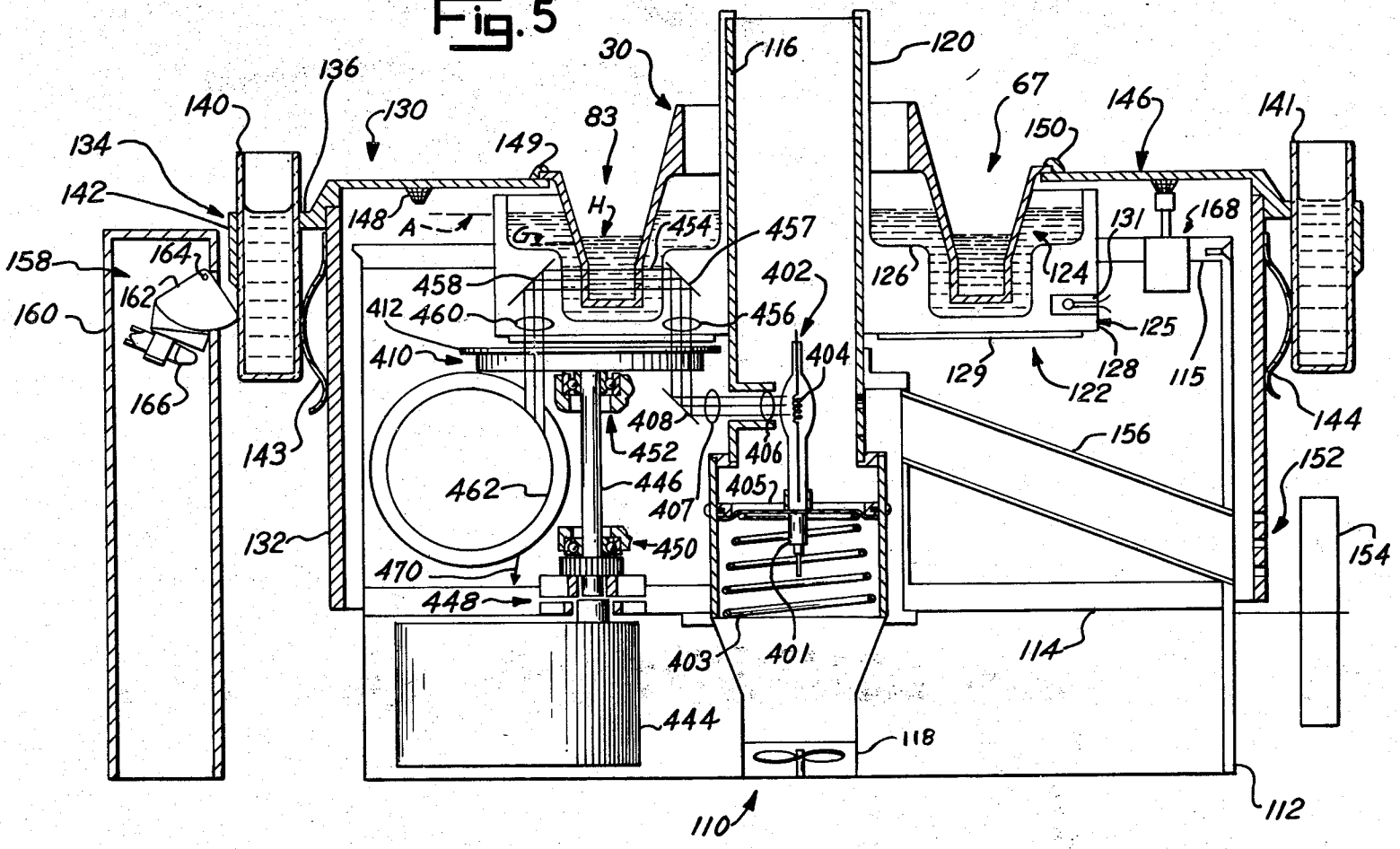
FIG. 5 is a cross-sectional, fragmentary, partially schematic view showing the cuvette assembly, carrousel assembly, cycling apparatus, positioning apparatus, and a portion of the analyzing apparatus of the preferred embodiment.

Referring to FIGS. 1 and 5, carrousel assembly 110 comprises a cylindrical base member 112 that supports platforms 114, 115. Platform 114 carries cylindrical support column 116 through which air is circulated by a fan 118 for cooling purposes. A cylindrical outer column 120 is carried by the top of column 116.

An incubator assembly 122 comprises a generally toroidal bath chamber 124 which is formed by a hollow receptacle 125 comprising a cylindrical inner wall 126 and a cylindrical outer wall 128. Wall 126 is integrally formed with column 120. Walls 126 and 128 are fabricated from a good thermal conducting material such as aluminum or copper. Windows that readily pass radiant energy in order to accommodate analyzing apparatus described hereafter are located in walls 126 and 128. Bath chamber 124 is filled with water to level A shown in FIG. 5. The water is heated to predetermined temperature by a heater element 129, and the heater element is controlled by a thermistor 131 and a manually adjustable control switch (not shown). As shown in FIG. 5, the incubator is used in order to maintain the specimens held in the cuvette compartments at a predetermined temperature. As previously described, the cuvette compartments are separated so that the water of incubator assembly 122 freely flows adjacent each specimen. Applicant has found that this arrangement brings the specimens up to temperature faster and holds the specimens at a more uniform temperature than has heretofore been possible.

Still referring to FIGS. 1 and 5, assembly 110 is provided with a movable positioning platform 130 comprising a cylindrical skirt 132 and a ring-shaped test tube retainer 134. The retainer comprises a horizontal ring member 136 that is provided with holes for receiving 32 test tubes commonly designated by the number 138, and including exemplary test tubes 140, 141. Each of the test tubes lies along a radius common to a corresponding cuvette compartment. The retainer also comprises a vertical ring-shaped retainer 142. According to the preferred embodiment of the invention, the test tubes are used to hold chemical samples prior to the time they are mixed with a suitable reagent to form a specimen for analysis. The tubes are biased against retainer 142 by resilient spring clips, such as exemplary clips 143, 144. The clips are mounted on skirt 132.

Positioning platform 130 also comprises a raised, ring-shaped portion 146 that carries on its underside a circular positioning member 148 bearing detents. Member 148 is provided with one detent opposite each test tube and corresponding cuvette compartment, so that each specimen may be accurately located in a predetermined analyzing position during the analysis procedure. The entire positioning platform is rotatably mounted on the platform 115 by means not shown. The inner edges of platform 130 are fitted with guides, such as guides 149, 150 that comate with the notches of lip 92 of cuvette assembly 30. By using the guides, the cuvette assembly is precisely located on the platform and is rotatable therewith.

Figure 6:
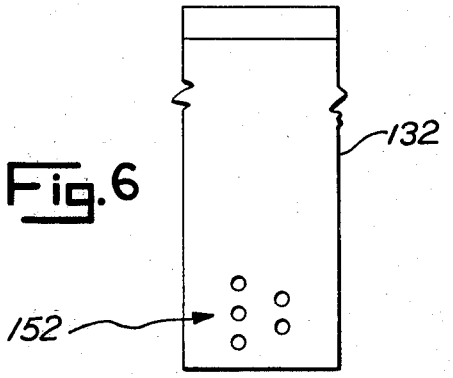
FIG. 6 is a front elevational view of a preferred form of position encoding apparatus made in accordance with the present invention.

Cylindrical skirt 132 comprises 32 sets of five coded holes that are drilled adjacent a radial line extending from each cuvette compartment. An exemplary set of 152 of such coded holes are shown in FIG. 6. Referring again to FIG. 5, light is transmitted through the coded holes to a plurality of stationary phototransistors 154 by a light pipe 156. As explained in more detail later, the coded holes are used to generate a binary identity code that uniquely identifies each test tube and corresponding cuvette compartment that is moved into the analyzing position. That is, each of the test tubes and corresponding cuvette compartments is identified by a different arrangement of coded holes which can be recognized and used to perform certain machine functions. The manner in which cells 54 are arranged in order to recognize the hole binary code is well-known to those skilled in the art.

As shown in FIG. 5, a test tube detection assembly 158 is held in a cabinet 160 that is located one position ahead of the analyzing position. The assembly comprises a pendulum 162 pivoted around a rod 164. The pendulum normally swings into the path of test tubes 138, and in that position, causes a mercury switch 166 to be closed. When a test tube is positioned opposite assembly 158, pendulum 162 is moved to the position shown in FIG. 5, thereby causing switch 166 to open. Assembly 158 is arranged so that the normal operation of the system is interrupted if no test tube is present at a particular position in ring member 136.

Figure 7:
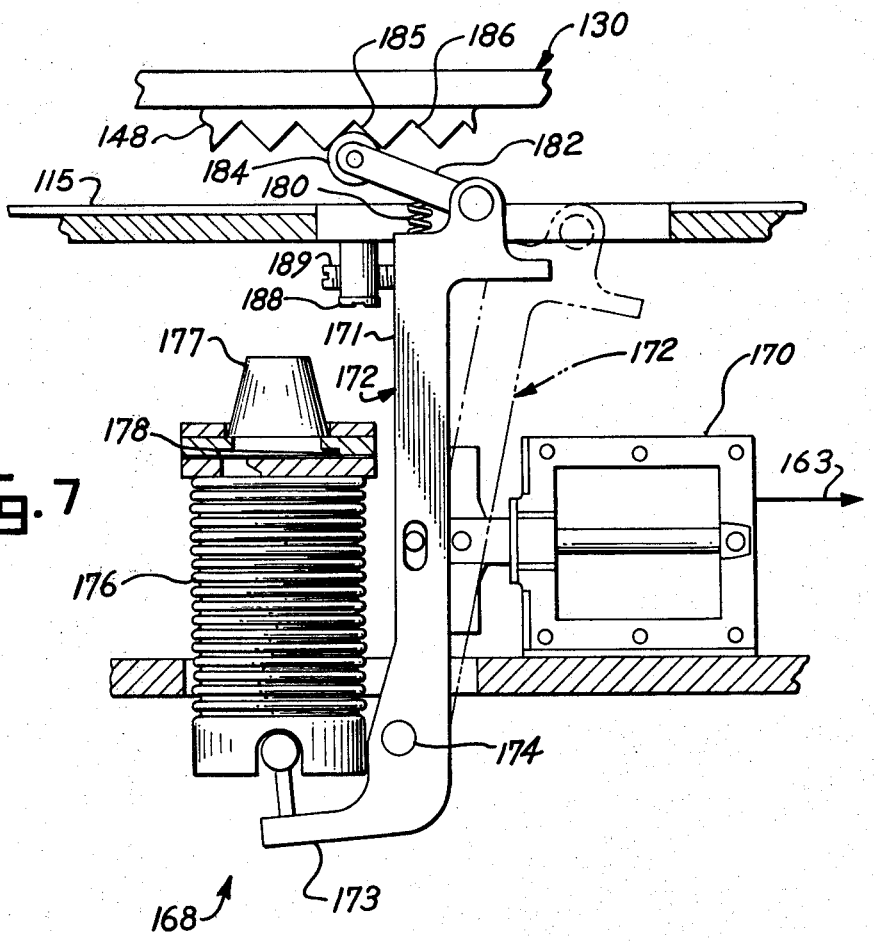
FIG. 7 is a fragmentary, partially cross-sectional side elevational view of a preferred form of carrousel advance apparatus made in accordance with the present invention.

Carrousel assembly 200 also comprises a cycling assembly 168 shown in FIG. 7. Assembly 168 comrises a solenoid 170 that operates an actuator arm 172 comprising an upper arm 171 and a lower arm 173 that pivot about a bearing 174. Assembly 168 also comprises a metallic bellows 176 that is normally filled with oil. A flexible hat-section 177 is located above the bellows and is connected thereto by a flapper valve 178 that controls the movement of oil. A spring 180 mounted on actuator arm 172 biases a roller arm 182 in an upward direction (as shown in FIG. 7). A roller 184 is rotatably mounted at the outer end of roller arm 182 and is biased into contact with the detents of positioning member 148, such as exemplary detents 185, 186. As previously described, positioning member 148 is rigidly attached to positioning platform 130 on which cuvette 30 is carried. The biasing action of spring 180 ensures the precise positioning of the positioning platform at all times.

The cycling assembly operates as follows. When solenoid 170 is activated, it forces upper arm 171 to the right (as shown in FIG. 7), and forces lower arm 173 upward, thereby compressing bellows 176 in an upward direction. This force is resisted by the bellows which is filled with oil. In order to relieve the oil pressure, flapper valve 178 opens, thereby permitting oil from the bellows to flow freely into flexible hat-section 177. As upper arm 171 is moved to the right, roller 184 is removed from detent 185 and is repositioned in detent 186. The foregoing motion of the actuator arm is extremely rapid, so that the carrousel positioning platform 130 temporarily remains in a stationary position. At the completion of the solenoid stroke, the actuator arm reaches the position shown in phantom in FIG. 7. At this time, the solenoid is de-energized, and the resiliency of the metallic bellows biases the actuator arm toward its original position. The return of the actuator arm to its original position is damped by the closing of flapper valve 178. The flapper valve is provided with a hole therein so that the oil can leak into the metallic bellows at a predetermined rate, thereby providing a smooth, steady return motion to the actuator arm. As a result, when the actuator arm is returned to its initial position, detent 186 is moved to the position formerly occupied by detent 185, so that positioning platform 130 is advanced one position. As the positioning platform is advanced, the cuvette compartments are also advanced one position.

A stop lever 188 having a threaded adjustment screw 189 is used to adjust the normal position of the actuator arm so that the positioning platform will support the cuvette assembly in an exact, predetermined position after every solenoid stroke. The cycling assembly is used to sequentially advance the cuvette compartments into the path of an analyzing beam.

Referring to FIG. 5, light is passed through the cuvette by analyzing apparatus comprising a light source 402 having a filament 404 that produces light throughout the visible and ultraviolet spectrum. The light source is held in a socket 401 by a spring 403 and an indexing plate 405. The light source supplies light to lenses 406, 407 that focus the light through a mirror 408 onto a ring-shaped filter 412 located on a disc 410, and to a commutator ring of disc 410. Disc 410 rotates about an axis located in the center thereof.

Disc 410 is rotated by a motor-gear unit 444 (FIG. 5) that rotates a shaft 446 through a magnetic coupling 448 and bearings 450, 452. Unit 444 is geared to rotate disc 410 at about 1800 rmp.

When filter 412 is being rotated, light from source 402 passes therethrough and generates beams of light along a single path 454. The monochromatic light pulses generated by the filter and source 402 in a single path pass through each specimen to be analyzed. For example, if compartment 83 of cuvette 30 is located in the analyzing position shown in FIG. 5, the pulses are passed through a lens 456, reflected from a mirror 457, and transmitted through the incubator bath chamber 124. The pulses thereafter pass through planar portion 98 of cuvette 30, the specimen in compartment 83, planar portion 100, bath chamber 124, a mirror 458, and another lens 460 that focuses the resulting transmitted pulses onto a portion of filter 412 that is 180° displaced from the portion of the filter which produced the pulses. Since corresponding identical segments of the filter are displaced by 180° of arc, each pulse is filtered by identical filters before it enters the specimen and after it leaves the specimen.

After the pulses transmitted from the specimen pass through filter 412, they are transmitted into a photomultiplier transducer tube 462 that sequentially produces electrical pulse signals having values proportional to the intensity of the light transmitted through the specimen. Preferred apparatus for processing signals produced by tube 462 is shown in the above-described related application which is incorporated by reference.

Those skilled in the art will appreciate that the specific embodiments described herein may be altered and changed by those skilled in the art without departing from the true spirit and scope of the invention which is defined in the appended claims.

What is claimed is:

1. In a chemical analyzer, an improved cuvette comprising:

integrally formed means for defining individual compartments adapted to hold specimens, said compartments being arranged to pass through a line defining a closed curve having a central axis; [and]

window means *associated with each compartment comprising opposed planar members that are parallel to each other* for transmitting radiant energy through at least some portions of the compartments, whereby the specimens may be analyzed;

*ventilation means for defining an opening within said curve for allowing the passage of air; and*

*additional analyzing apparatus comprising:*

*a source of radiant energy located within the area bounded by a vertical projection of said line defining a closed curve;*

*rotation means for rotating the cuvette in relationship to the radiant energy source, whereby the radiant energy sequentially passes through the window means in each of said compartments; and*

*means for passing air over the source and through said opening, whereby the source is cooled.*

[2. A cuvette, as claimed in claim 1, and further comprising ventilation means for defining the opening within said curve for allowing the passage of air.]

[3. A cuvette, as claimed in claim 1, wherein a common plane intersects each of the window means.]

[4. A cuvette, as claimed in claim 1, wherein the window means associated with each compartment comprises opposed planar members that are parallel to each other.]

[5. A cuvette, as claimed in claim 1, wherein the compartments comprise sidewall means and wherein the window means are formed integrally with the sidewall means.]

[6. A cuvette, as claimed in claim 1, wherein each compartment comprises bottomwall means that are curved adjacent the compartment.]

7. A cuvette, as claimed in claim [1] *14*, wherein the window means are fabricated from material that transmits ultraviolet light.

8. A cuvette, as claimed in claim 7, wherein the window means are fabricated from acrylic.

[9. A cuvette, as claimed in claim 1, wherein the compartments are interrupted by air spaces.]

[10. A cuvette, as claimed in claim 9, and further comprising temperature control means for maintaining the specimens at a predetermined temperature comprising:

a bath solution in which the sidewall means are at least partially immersed so that the bath solution enters the air spaces between the compartments; and means for maintaining the bath solution at a constant temperature.]

[11. A cuvette, as claimed in claim 2, in combination with additional analyzing apparatus comprising a source of radiant energy located within the area bounded by a vertical projection of said line defining a closed curve.]

[12. Apparatus, as claimed in claim 11, and further comprising:

rotation means for rotating the cuvette in relationship to the radiant energy source, whereby the radiant energy sequentially passes through the window means in each of said compartments; and means for passing air over the source and through said opening, whereby the source is cooled.]

13. Apparatus, as claimed in claim [12] *1*, wherein the source is aligned so that the radiant energy is transmitted perpendicular to the surface of the window means at some time during the operation of the rotation means.

*14. An improved cuvette for use in a chemical analyzer comprising:*

*integrally formed means for defining individual compartments adapted to hold specimens, said compartments having an open end and a closed end and being arranged to pass through a line defining a closed curve having a central axis, said integrally formed means comprising*

*an outer sidewall defining an outer edge which fits within a circle having a center point lying in the central axis and defining a first slanting surface which is a common boundary for the compartments and which is slanting with respect to the central axis,*

*an inner sidewall defining a second slanting surface which is a common boundary for the compartments and which is slanting toward the first slanting surface,*

*bottomwall means extending between the outer and inner sidewalls adjacent the closed end of the compartments,*

*a plurality of spacer means integrally formed with the outer sidewall, inner sidewall and bottomwall means for preventing the transfer of a specimen between adjacent compartments, each said spacer means comprising*

*an upper section at least partially located adjacent the open end of a compartment,*

*a first lower section integrally formed with a first one of the plurality of bottomwall means and*

*a second lower section integrally formed with a second one of the plurality of bottomwall means, the first and second lower sections being separated by an air space, whereby heated fluid can flow around each compartment to incubate the specimens;*

*lip means integrally formed with the outer sidewall and extending radially outward from the outer edge of the outer sidewall for supporting and securing the cuvette;*

*ventilation means for defining an opening within the inner sidewall for allowing the passage of air; and*

*window means for transmitting radiant energy through at least some portions of each of the compartments comprising an opposed pair of planar members separated by a predetermined distance located in each compartment, one of the planar members in each pair being integrally formed with the outer sidewall and the other of the planar members in each pair being integrally formed with the inner sidewall, each of said planar members intersecting a common plane, whereby the specimens may be analyzed.*

*15. A cuvette, as claimed in claim 14, wherein the first slanting surface defines a portion of the lateral area of a first cone and wherein the second slanting surface defines a portion of the lateral area of a second cone which intersects the first cone.*

*16. A cuvette, as claimed in claim 15, wherein any line lying in the lateral area of the first cone and intersecting the central axis makes a predetermined acute angle with respect to the central axis and wherein any line lying in the lateral area of the second cone and intersecting the central axis also makes substantially the same predetermined acute angle with respect to the central axis.*

*17. A cuvette, as claimed in claim 16, wherein the predetermined acute angle is at least 15 degrees, so that the specimen is inhibited from splashing as the compartment is being filled.*

*18. A cuvette, as claimed in claim 14, wherein the outer sidewall comprises a first upper edge adjacent the open end of the compartments defining a first circle having a first center point lying in the central axis, and wherein the inner sidewall comprises a second upper edge adjacent the open end of the compartments defining a second circle having a second center point lying in the central axis.*

*19. A cuvette, as claimed in claim 18, wherein the inner and outer sidewalls are each 0.04 inch thick.*

*20. A cuvette, as claimed in claim 14, wherein the lip means comprises a planar upper surface defining a first plane perpendicular to the central axis and a planar lower surface defining a second plane parallel to the first plane.*

*21. A cuvette, as claimed in claim 20, wherein the lip means defines an outer perimeter and comprises a plurality of positioning notches, each said positioning notch being located adjacent the perimeter and opposite one of the compartments.*

*22. A cuvette, as claimed in claim 21, wherein each positioning notch and the compartment located opposite the positioning notch are bisected by a plane passing through the central axis.*

*23. A cuvette, as claimed in claim 22, wherein each positioning notch includes an arcuate shaped section.*

*24. A cuvette, as claimed in claim 23, wherein a positioning notch is located opposite each compartment.*

*25. A cuvette, as claimed in claim 14, wherein the predetermined distance between the planar members is one centimeter, and wherein the planar members in each pair are substantially parallel.*

*26. A cuvette as claimed in claim 25, wherein the upper section of each spacer means is planar and wherein the air space is wider than the planar upper section, so that the cuvette can be nested with another like cuvette.*

*27. A cuvette, as claimed in claim 26, wherein each planar upper section of each spacer means is bisected by a plane which passes through the central axis.*

*28. A cuvette, as claimed in claim 14, wherein each bottomwall means is curved adjacent a compartment so that mixing of the specimen is aided.*

*29. A cuvette, as claimed in claim 14, wherein the ventilation means comprises a hollow collar integrally formed with the inner sidewall, whereby air may pass through the hollow portion of the collar.*

*30. A cuvette, as claimed in claim 29, wherein the collar defines a cylinder having an axis colinear with the central axis and defines a circular upper edge lying in a plane perpendicular to the central axis.*

*31. A cuvette, as claimed in claim 15, wherein the lip means defines an outer perimeter and comprises a plurality of positioning notches, each said positioning notch being located adjacent the perimeter and opposite one of the compartments.*

*32. A cuvette, as claimed in claim 31, wherein each bottomwall means is curved adjacent a compartment so that mixing of the specimen is aided.*

*33. A cuvette, as claimed in claim 32, wherein the ventilation means comprises a hollow collar integrally formed with the inner sidewall, whereby air may pass through the hollow portion of the collar.*

*34. A cuvette, as claimed in claim 33, wherein any line lying in the lateral area of the first cone and intersecting the central axis makes a predetermined acute angle with respect to the central axis and wherein any line lying in the lateral area of the second cone and intersecting the central axis also makes substantially the same predetermined acute angle with respect to the central axis.*

*35. A cuvette, as claimed in claim 34, wherein each positioning notch and the compartment located opposite the positioning notch are bisected by a plane passing through the central axis.*

*36. A cuvette, as claimed in claim 35, wherein the upper section of each spacer means is planar and wherein the air space is wider than the planar upper section, so that the cuvette can be nested with another like cuvette.*

*37. A cuvette, as claimed in claim 36, wherein the collar defines a cylinder having an axis colinear with the central axis and defines a circular upper edge lying in a plane perpendicular to the central axis.*

*38. A cuvette, as claimed in claim 37, wherein the predetermined acute angle is at least 15 degrees, so that the specimen is inhibited from splashing as the compartment is being filled.*

*39. A cuvette, as claimed in claim 38, wherein a positioning notch is located opposite each compartment, and wherein each positioning notch includes an arcuate shaped section.*

*40. A cuvette, as claimed in claim 39, wherein each planar upper section of each spacer means is bisected by a plane which passes through the central axis.*

*41. A cuvette, as claimed in claim 40, wherein said plane which passes through the central axis also bisects said air space.*

*42. A cuvette, as claimed in claim 41, wherein the inner and outer sidewalls are 0.04 inch thick, wherein the predetermined distance between the planar members is one centimeter, and wherein the planar members in each opposed pair are substantially parallel.*

* * * * *